United States Patent [19]

Bürge et al.

[11] Patent Number: 5,108,510
[45] Date of Patent: Apr. 28, 1992

[54] HIGHLY REACTIVE HYDRAULIC BINDER FOR THE PREPARATION OF BUILDING, CONSTRUCTION AND RAW MATERIALS

[75] Inventors: Theodor A. Bürge, Geroldswil; Eugen Bodenmann, Zurich, both of Switzerland

[73] Assignee: Sika AG, vorm. Kaspar Winkler, Zurich, Switzerland

[21] Appl. No.: 524,806

[22] Filed: May 18, 1990

[30] Foreign Application Priority Data

May 19, 1989 [CH] Switzerland .................. 1888/89

[51] Int. Cl.$^5$ .................. C04B 7/24; C04B 7/30
[52] U.S. Cl. .................. 106/696; 106/706; 106/763; 106/819
[58] Field of Search ........... 106/718, 763, 773, 793, 106/273.1, 705, 706, DIG. 2, 819, 692, 696; 501/155

[56] References Cited

U.S. PATENT DOCUMENTS

| | | | |
|---|---|---|---|
| 1,314,752 | 5/1918 | Olsen | 106/718 |
| 3,245,812 | 4/1966 | Hobaugh et al. | 501/123 |
| 3,902,914 | 9/1975 | Gagle et al. | 106/273.1 |
| 4,102,700 | 7/1978 | Kwech et al. | 106/716 |
| 4,338,135 | 7/1982 | Cook | 106/723 |
| 4,375,985 | 3/1983 | Guillaud et al. | 106/634 |
| 4,415,365 | 11/1983 | Spars et al. | 106/706 |
| 4,680,059 | 7/1987 | Cook et al. | 106/705 |

FOREIGN PATENT DOCUMENTS

3610722 10/1986 Fed. Rep. of Germany.
664369 1/1952 United Kingdom.

OTHER PUBLICATIONS

Chem Abstract (Answer #3) "Oil Shale Ash Binders for Bricks", GB-1381017 (Jan. 22, 1975) Tekology Corp.
*Concrete Admixtures Handbook* p. 186 Ramachandran Noyes Publications (1984).
A. Bentur et al., "Modification of the Cementing Properties of Oil Shale", Jan. 1984, vol. 23, No. 2, pp. 290–294.
R. Rohrbach, "Herstellung von Olschieferzment und Gewinnung elektrischer Energie aus Olschiefer nach dem Rohrbach-Lurgi-Verfahren", Jul. 1969, vol. 58, No. 7, pp. 293–296.

*Primary Examiner*—William R. Dixon, Jr.
*Assistant Examiner*—Paul Marcantoni
*Attorney, Agent, or Firm*—Burns, Doane, Swecker & Mathis

[57] ABSTRACT

Disclosed is a highly reactive hydraulic binder for the preparation of building, construction and raw materials which contains burned oil shale and at least one compound, selected from the group, consisting of
  an amorphous oxide of 3- and/or 4-valent cations,
  an amorphous hydroxide of 3- and/or 4-valent cations, and
  an aluminate of 1- and/or 2-valent cations, as well as
at least one water reducing agent.

19 Claims, No Drawings

HIGHLY REACTIVE HYDRAULIC BINDER FOR THE PREPARATION OF BUILDING, CONSTRUCTION AND RAW MATERIALS

BACKGROUND OF THE INVENTION

The present invention is directed to a highly reactive hydraulic binder for the preparation of building, construction and raw materials.

Conventional hydraulic binders, such as cement and chalk, have setting times of about 5 hours and a characteristically slow time for strength development. However, in many applications, e.g., the repair of streets, bridges, runways etc., quick hardening is very important.

With shorter repair times, the aforementioned constructions may be opened, and thus, enormous costs may be saved. Thus, quick development is of economic interest.

Oil shale is a fossilized energy carrier, containing a considerable amount of organic material in a matrix of fine inorganic minerals. In order to obtain the oil from oil shale, the organic substance, the kerogen, must be thermically decomposed. It remains an inorganic residue, which is denoted as burned oil shale. A large amount of today's burned oil shale must be disposed of, unused, in dumps.

The biggest deposits of oil shale are located in the United States of America, Brazil, USSR, Canada, Italy, Germany and Australia.

In addition to the denotations oil shale, bituminous slate and kerogen rocky material, also some names refer to similar materials of a distinct deposit or of an area, such as slate coal, cooro'ngite, ichthyol slate, kukersite, marahunite, posidonien slate, stink slate, tasmanite or torbanite.

The most frequent minerals in the oil shale deposits are quartz, feldspar, different types of clay and different types of carbonates, e.g., calcium carbonate and magnesium carbonate.

Table 1 below shows the mineralogical composition of American oil shale (green river).

TABLE 1

| Mineral | Chemical Formula | Portion in mass % |
|---|---|---|
| dolomite | $CaMg(CO_3)_2$ | 32–33 |
| calcspar | $CaCO_3$ | 16–20 |
| quartz | $SiO_2$ | 10–15 |
| clays (illite) | $K_2O.3Al_2O_3.6SiO_2.2H_2O$ | 11–19 |
| orthoclase (adularia) | $KAlSi_3O_8$ | 4–6 |
| plagioclase (albite) | $NaAlSi_3O_8.CaAl_2Si_2O_8$ | 10–12 |
| zeolite (analcime) | $NaAlSi_2O_6.H_2O$ | 1–7 |
| pyrite, marcasite | $FeS_2$ | 1–3 |

Oil shale is a laminated sediment rocky mineral, which contains more than 33% of ash as well as organic components. On distillation it yields oil, which may be extracted only in unimportant amounts with conventional solvents for petroleum. For energy gain, the oil shale must be decomposed in a suitable manner. In this regard, various carbonization, combustion and gasification processes are known.

The fluid bed process is a commercial combustion process for oil shale and raw materials containing bitumen and with marly characteristics. The main product is burned oil shale, which is used in the civil engineering product industry. Through liberated heat, the temperature of combustion in the furnace chamber is primarily maintained. Additionally, energy is regained.

Due to an optimal temperature of combustion of 800° C., this process supplies a calcination product having hydraulic characteristics, which provides the following compressive strengths according to DIN 1164 without the addition of chalk:

| Compressive strength | after 3 days | ~5 MPa |
|---|---|---|
| | 7 days | ~16 MPa |
| | 28 days | ~33 MPa. |

As a specific example North African burned oil shale shows a compressive strength of only 22 MPa after 28 days.

According to DIN 1164 burned oil shale is a hydraulic hardenable compound. It is formed by burning oil shale at about 800° C. in the fluid bed process. It mainly comprises calcium silicates, calcium aluminates, calcium sulfates and reactive silicon dioxide. With X-Rays the following mineralogical phases are detectable: dicalcium silicate, tricalcium aluminate, monocalcium aluminate, anhydrite, calcium oxide and calcium aluminate ferrite.

In Table 2 below, typical chemical compositions are shown.

TABLE 2

| | ORIGIN | | | |
|---|---|---|---|---|
| Compounds | Scotland | Colorado/USA USA | Western Germany | Israel Tzefa Efe |
| CaO | 5.3% | 21.8% | 16–60% | 44.5% |
| $SiO_2$ | 48.5 | 32.0 | 12.25 | 19.0 |
| $Al_2O_3$ | 25.2 | 7.2 | 9–12 | 8.3 |
| $Fe_2O_3$ | 12.1 | 2.7 | 6–7 | 4.3 |
| MgO | 2.2 | 7.5 | 1.4–2.0 | 0.7 |
| $Na_2O + K_2O$ | — | 2.3 | — | 1.1 |
| $P_2O_5$ | — | — | — | 2.4 |
| $SO_3$ | — | — | 9–10 | 8.5 |
| Organic portion | — | — | — | 0.9 |
| $CO_2$ | — | — | — | 6.2 |
| Loss at red heat | — | 20.0 | — | 11.3 |

Burned oil shale relatively slow hydraulic hardening, which is due to its solidification behavior. According to DIN 1164, setting begins at about 2.5 hours, and ends at about 5 hours.

Burned oil shale is used for the preparation of Portland oil shale cements of different strength classes, whereby the portions of the Portland cement clinker may be from 65 to 90%, and the portions of burned oil shale may be from 10 to 35%.

The clinker minerals, especially dicalcium silicate and calcium aluminate, as well as the reaction of the burned chalk with silicon dioxide, are reasons for the hydraulic hardening of burned oil shale. Simultaneously, a formation of ettringit (calciumsulfoaluminate) takes place. For several applications the characteristics common to burned oil shale and its mixtures with Portland cement, such as slow setting times and low strength development, are not sufficient.

SUMMARY OF THE INVENTION

Hence, it is a general object of the present invention to improve the aforementioned characteristics and therewith, while still utilizing large amounts of burned oil shale in new, economical interesting, applications.

Based on several experiments it was quite surprisingly found that the hardening of burned oil shale may be accelerated in such a way that the compressive strengths typically found after 7 days can be obtained after 2 hours, and that the compressive strengths after 28 days are reached in less than 24 hours. Also, this accelerated strength development time may be controlled as desired. Depending upon the application, sufficient hardening may be realized within a few minutes, or just after a few hours.

It is an object of the present invention to provide a highly reactive hydraulic binder which hardens much faster, than it is an object to use known binders. Also a waste product, i.e. burned oil shale, in a new significant way.

Therefore, the present invention relates to a highly reactive hydraulic binder for preparing building, construction and raw materials. The binder comprises (i) burned oil shale, (ii) at least one member of the group of amorphous oxides of 3-valent cations, amorphous oxides of 4-valent cations, amorphous hydroxides of 3-valent cations, amorphous hydroxides of 4-valent cations, aluminates of single valent cations and aluminates of 2-valent cations, and (iii) at least one water reducing agent. In another embodiment the invention the binder further comprises (iv) at least one of the group of setting accelerating agents, setting retarding agents, polymers, and fibers.

A particularly preferred embodiment of the invention relates to a highly reactive hydraulic binder suitable for preparing building, construction and raw materials which comprises:

1-99.3% by weight burned oil shale;
0.1-70% by weight of at least one member of the group of aluminates of single valent and 2-valent cations;
0.01-10% by weight of at least one water reducing agent;
0.01-7% by weight of at least one setting retarding agent;
0.1-50% by weight of at least one member of the group of amorphous oxides of 3-valent and 4-valent cations and amorphous hydroxides of 3-valent and 4-valent cations.

up to 90% by weight of cementous material;
up to 30% by weight of a polymeric material; and
up to 20% by weight fiber material.

Another aspect of the invention relates to a process for hardening a highly reactive binder according to the invention. The process comprises (i) mixing said binder with an effective mixing amount of water, and (ii) hardening the mixture. The can be hardened at a temperature ranging from $-30°$ to $150°$ C. And, the mixture can be hardened by applying microwaves for a period sufficient to harden the mixture.

DESCRIPTION OF THE PREFERRED EMBODIMENTS

The binder of the invention may be prepared economically of amorphous oxides and hydroxides of 3- and 4-valent cations and/or further aluminium compounds, as well as of those residuals, which are obtained by the low temperature carbonization or combustion of oil shale (burned oil shale).

Preferred amorphous oxides are selected from at least one of amorphous aluminum oxide and amorphous silicon dioxide. A preferred amorphous hydroxide is aluminum hydroxide. Preferred aluminates include at least one of alkali metal aluminates and calcium aluminate. The calcium aluminate can be a clinker constituent of a cement.

Especially effective accelerators include amorphous oxides and/or hydroxides of 3- and 4-valent cations as well as alkali metal- and/or alkaline earth metal aluminates, whereby calcium aluminates (CA, $CA_2$, $C_3A$ and $C_{12}A_7$) are particularly preferred. As set forth herein the abbreviations below have the following meaning:

$CA = CaO.Al_2O_3$
$CA_2 = CaO.2Al_2O_3$
$C_3A = 3CaO.Al_2O_3$
$C_{12}A_7 = 12CaO.7Al_2O_3$.

Alkaline earth metal aluminates may be prepared synthetically by known processes, they may also be added to the inventive mixture in the form of clinker constituents of a cement.

The water reducing agent can be selected from concrete plasticisers and fluidizers based on lignin sulfonate, a melamine copolymer, a naphthalene copolymer, an acrylic acid copolymer or a maleic acid copolymer.

The setting retarding agent can be selected from the group of polyhydroxyl compounds, polyhydroxy carboxylic acids, ortho-, meta-, pyro-, or poly-phosphates, borates (e.g., borate, meta borate or tetraborate), and mixtures thereof.

The polymer can be selected from the group of water soluble sulfonated synthetic resins, water dispersible vinyl-copolymers, styrene-copolymers and acryl-copolymers, mixtures of an emulsifiable epoxide resin and an emulsifiable hardener, and mixtures thereof.

Suitable fibers include fibers of at least one member of the group of polypropylene, polyester, polyamide, glass, metal, carbon, and mixtures thereof.

The following examples serve to illustrate the present invention.

EXAMPLE 1

An example of the inventive binder mixture has the following composition:

| | |
|---|---|
| Burned oil shale | 78 percent by weight |
| calcium aluminate | 8 percent by weight |
| amorphous silicon dioxide | 10 percent by weight |
| amorphous aluminium hydroxide | 1 percent by weight |
| concrete plasticizer (sulfonated melamine-formaldehyd-condensate) | 3 percent by weight |

The above mixture was mixed with 40 percent by weight of water and allowed to set.

The binder, mixed with sand or with sand or with sand and gravel, may be processed into building, construction and raw materials.

In the following examples the above mixture was used as binder.

EXAMPLE 2

This example shows that by addition of calcium aluminates, the setting times may be varied in large ranges.

Setting times of the binder samples, measured according to the Vicat-method according to DIN 1164 were as follows:

| Binder mixture % by weight | Calcium aluminate % by weight | Setting times Start (minutes) | End (minutes) |
|---|---|---|---|
| 100 | 0 | 200 | 240 |
| 96 | 4 | 65 | 85 |
| 92 | 8 | 55 | 65 |
| 88 | 12 | 28 | 35 |
| 84 | 16 | 20 | 30 |

EXAMPLE 3

This example shows that by the addition of amorphous aluminium compounds, the development of strength may be controlled.

The influence of the addition of amorphous aluminium hydroxide on the early strength (MPa) of concrete is illustrated below.

| % by weight of binder mixture | % by weight of Al-hydroxide | 2 hours compressive strength (MPa) |
|---|---|---|
| 100 | 0 | 0 |
| 99 | 1 | 3 |
| 98.5 | 1.5 | 4.2 |
| 98 | 2 | 5.5 |
| 97.5 | 2.5 | 8.3 |
| 97 | 3 | 14.9 |

Oxides hydroxides and carbonates of alkali metals and alkaline earth metals are suitable as additional accelerators.

Concrete plasticizers having which basically have a strong setting retarding effect may be used for the regulating processing time and the amount of mixing water. Products based on lignin sulfonate-, melamine-, naphthalene-, maleic acid-, and acrylic basis have been found to be suitable. Suitable retarding components include all phosphates, polyhydroxyl compounds and boron compounds, as well as polyhydroxycarboxylic acids.

The influence of a retarding plasticizer on the concrete flow table spread at a constant water/cement factor of 0.4 is illustrated below.

| % by weight of binder mixture | % by weight of retarding concrete plasticizer on melamine basis | Flow table spread of concrete in cm |
|---|---|---|
| 100 | 0 | — |
| 99 | 1 | 30 |
| 98 | 2 | 35 |
| 97 | 3 | 41 |
| 96 | 4 | 46 |
| 95 | 5 | 50 |

EXAMPLE 5

Polymers, dissolved in water, dispersed or emulsified, have a distinct influence on the development of strength.

By the addition of polymers, the adhesive strength, abrasion resistance and erosion resistance, as well as the resistance against chemicals, also greatly may be improved.

The influence of adding a polymer on the development of compressive strength (MPa) of standard mortar is illustrated below.

| Polymer | 2 hours | 4 hours | 24 hours | 7 days |
|---|---|---|---|---|
| water soluble melamine resin | 1,8 | 3,4 | 15,2 | 46,7 |
| dispersed acryl resin | 6,0 | 9,5 | 21,2 | 48,6 |
| emulsified epoxide resin + hardener | 0 | 1,8 | 30,6 | 50,4 |

EXAMPLE 6

The influence of adding a polymer on the adhesive strength (MPa) of standard mortar on concrete.

| Addition of polymer | Adhesive strength after 14 days (MPa) |
|---|---|
| water soluble melamine resin | 1,9 |
| dispersed acryl resin | 2,6 |
| emulsified epoxide resin + hardener | 3,2 |

EXAMPLE 7

The inventive binder mixtures may also be hardened at higher temperatures, or by using microwaves. By using microwaves, strengths may be reached after only 2 to 5 minutes. This example illustrates the development of strengths under different hardening conditions.

In particular, this example compares the effect of hardening with microwaves with hardening at room temperature in terms of its influence on compressive strength (MPa) of standard mortar.

|  | 3 minutes | 2 hours | 24 hours | 7 days | 28 days |
|---|---|---|---|---|---|
| room temperature | 0 | 1,8 | 15,2 | 46,7 | 61,1 |
| microwaves | 5,3 | 6,4 | 13,8 | 41,8 | 50,6 |

EXAMPLE 8

The example illustrates the effect of different calcium aluminates on the compressive strength of concrete (MPa) at different storage temperatures.

| | Hardening temperatures | | | |
|---|---|---|---|---|
| | 20° C. | | 5° C. | |
| | calcium aluminate | | | |
| | $C_3A$ | $C_{12}A_7$ | $C_3A$ | $C_{12}A_7$ |
| 4 hours | 5,0 | 22,7 | 1,0 | 6,4 |
| 24 hours | 22,3 | 28,1 | 10,1 | 17,9 |
| 7 days | 48,3 | 29,3 | 34,8 | 34,4 |
| 28 days | 58,8 | 36,4 | 50,4 | 40,3 |

While there are shown and described above preferred embodiments of the invention, it is to be distinctly understood that the invention is not limited thereto, but may be otherwise variously embodied and practiced within the scope of the following claims.

We claim:

1. A highly reactive hydraulic binder for preparing building, construction and raw materials, said binder comprising (i) burned oil shale, (ii) at least one member of the group of amorphous oxides of 3-valent cations, amorphous oxides of 4-valent cations, amorphous hydroxides of 3-valent cations, amorphous hydroxides of 4-valent cations, aluminates of single valent cations and aluminates of 2-valent cations, and (iii) at least one water reducing agent; said components (i), (ii), and (iii) being present in amounts effective to provide a hydraulically hardenable binder.

2. A highly reactive hydraulic binder according to claim 1, comprising an amorphous oxide.

3. A highly reactive hydraulic binder according to claim 2, wherein said amorphous oxide being selected from at least one of amorphous aluminum oxide and amorphous silicon dioxide.

4. A highly reactive hydraulic binder according to claim 1, comprising an amorphous hydroxide.

5. A highly reactive hydraulic binder according to claim 4, wherein said amorphous hydroxide is aluminum hydroxide.

6. A highly reactive hydraulic binder according to claim 1, comprising an aluminate.

7. A highly reactive hydraulic binder according to claim 6, said aluminate being selected from at least one of alkali metal aluminates and calcium aluminate.

8. A highly reactive hydraulic binder according to claim 7, said aluminate being a calcium aluminate.

9. A highly reactive hydraulic binder according to claim 8, said calcium aluminate being a clinker constituent of a cement.

10. A highly reactive hydraulic binder according to claim 1, wherein the water reducing agent is selected from the group consisting of concrete plasticisers and fluidizers based on lignin sulfonate, a melamine copolymer, a naphthalene copolymer, an acrylic acid copolymer or a maleic acid copolymer and mixtures thereof.

11. A highly reactive hydraulic binder according to claim 1, further comprising (iv) setting accelerating agents, setting retarding agents, and/or fibers.

12. A highly reactive hydraulic binder according to claim 11, comprising a setting retarding agent selected from the group consisting of polyhydroxyl compounds, polyhydroxy carboxylic acids, phosphates, borates, and mixtures thereof.

13. A highly reactive hydraulic binder according to claim 1, comprising a polymer selected from the group consisting of water soluble sulfonated synthetic resins, water dispersible vinylcopolymers, styrene-copolymers and acryl-copolymers, mixtures of an emulsifiable epoxide resin and an emulsifiable hardener, and mixtures thereof.

14. A highly reactive hydraulic binder according to claim 11, comprising fibers of at least one member of the group of polypropylene, polyester, polyamide, glass, metal, carbon, and mixtures thereof.

15. A process for hardening a highly reactive binder, said process comprising (i) mixing said binder with an effective mixing amount of water, wherein said binder comprises (a) burned oil shale, (b) at least one member of the group of amorphous oxides of 3-valent cations, amorphous oxides of 4-valent cations, amorphous hydroxides of 3-valent cations, amorphous hydroxides of 4-valent cations, aluminates of single valent cations and aluminates of 2-valent cations, and (c) at least one water reducing agent, and (ii) hardening the mixture.

16. A process according to claim 15, wherein the mixture is hardened at a temperature ranging from −30° to 150° C.

17. A process according to claim 15, wherein the mixture is hardened by applying microwaves for a period sufficient to harden the mixture.

18. A highly reactive hydraulic binder suitable for preparing building, construction and raw materials, said binder comprising:
   1–99.3% by weight burned oil shale;
   0.1–70% by weight of at least one member of the group of aluminates of single valent and 2-valent cations;
   0.01–10% by weight of at least one water reducing agent;
   0.01–7% by weight of at least one setting retarding agent;
   0.1–50% by weight of at least one member of the group of amorphous oxides of 3-valent and 4-valent cations and amorphous hydroxides of 3-valent and 4-valent cations.
   up to 90% by weight of cementous material;
   up to 30% by weight of a polymeric material; and
   up to 20% by weight fiber material.

19. A highly reactive hydraulic binder according to claim 1, further comprising iv) at least one polymer.

* * * * *